W. F. McGLAUGHLIN.
FOOD DELIVERING AND ORDERING APPARATUS.
APPLICATION FILED DEC. 17, 1919.
1,360,657.
Patented Nov. 30, 1920.
6 SHEETS—SHEET 1.
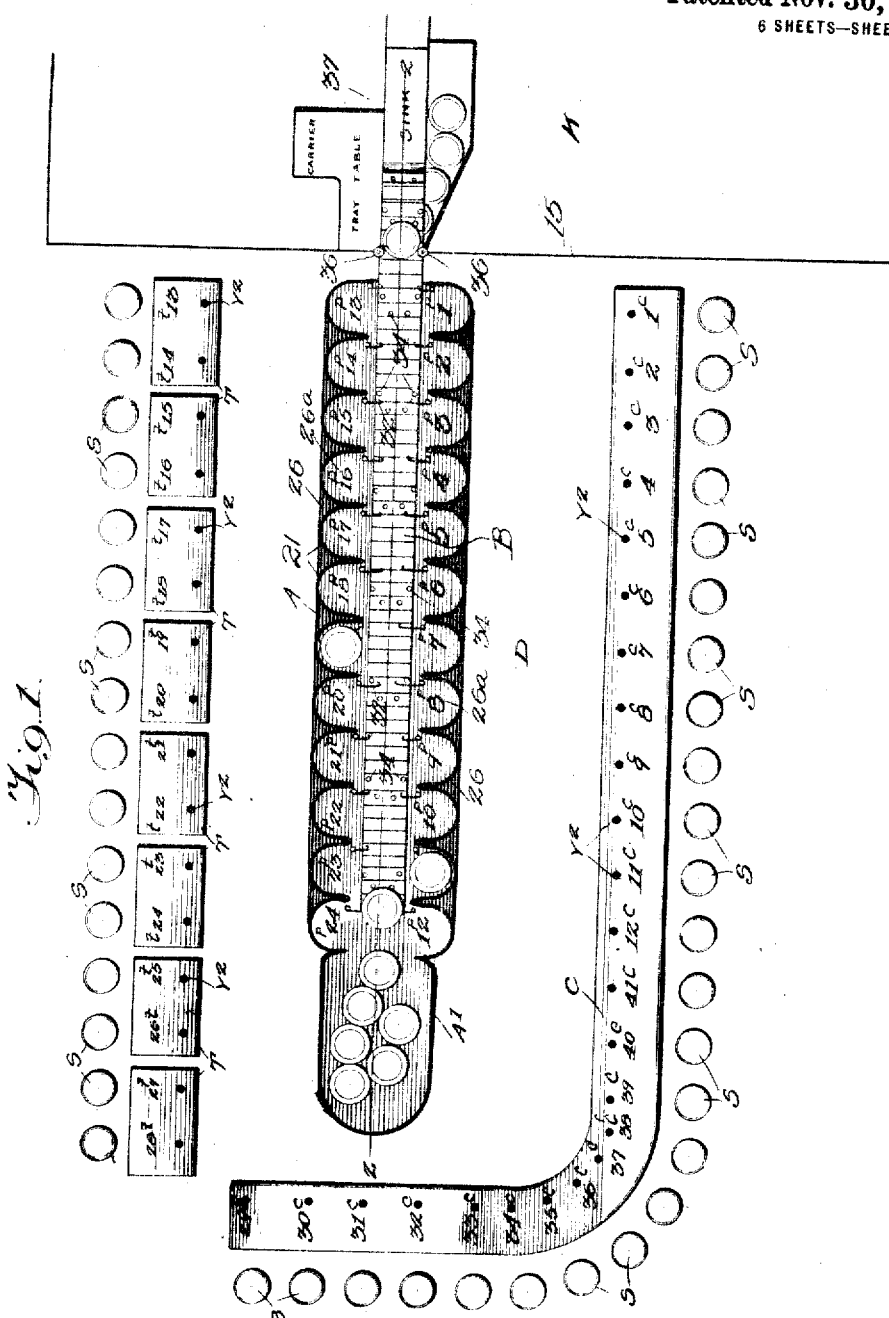
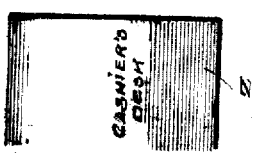
WITNESSES
INVENTOR
W. F. McGLAUGHLIN,
BY
ATTORNEYS W. F. McGLAUGHLIN.
FOOD DELIVERING AND ORDERING APPARATUS.
APPLICATION FILED DEC. 17, 1919.
1,360,657.
Patented Nov. 30, 1920.
6 SHEETS—SHEET 2.
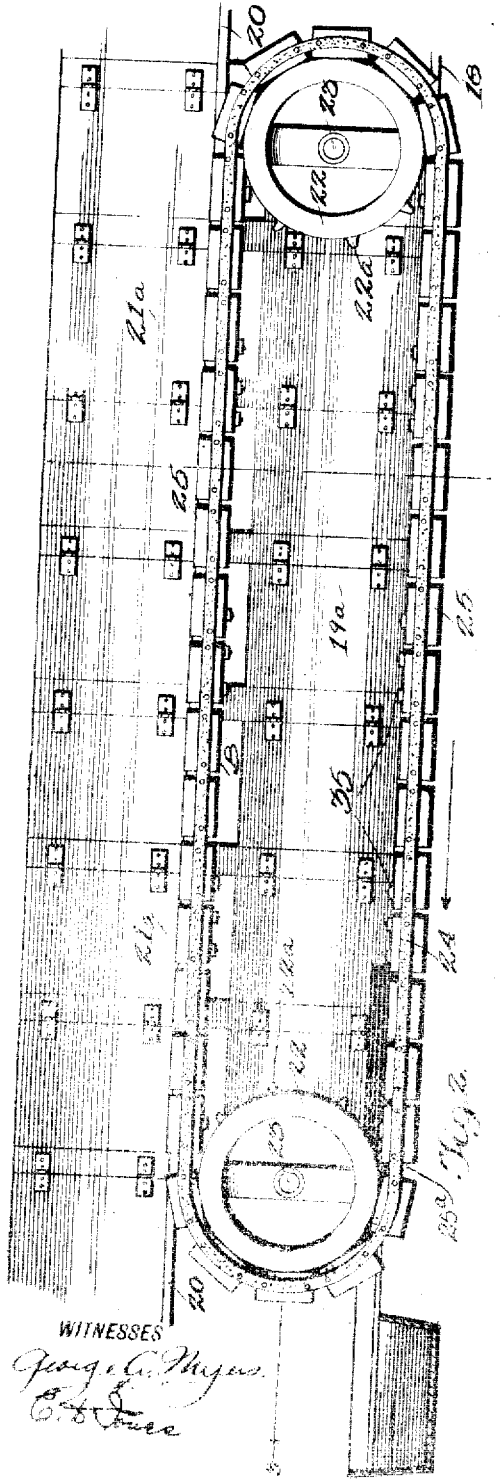
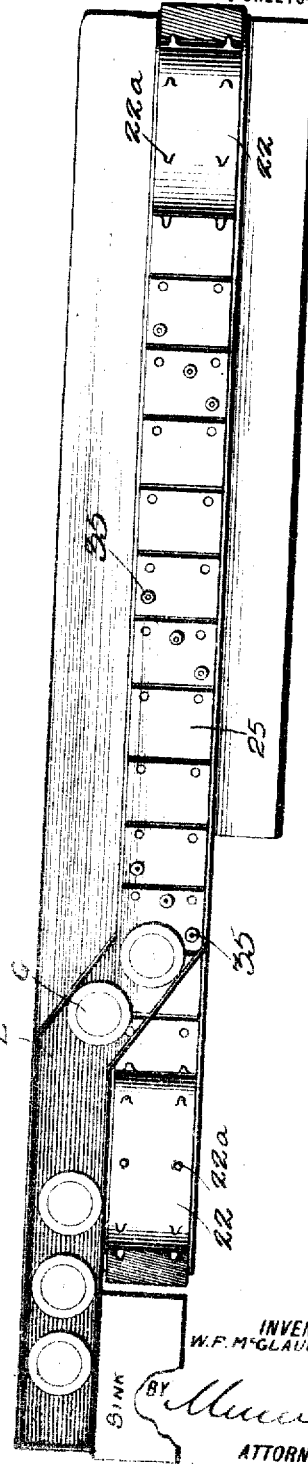
WITNESSES
INVENTOR
W. F. McGLAUGHLIN,
BY
ATTORNEYS W. F. McGLAUGHLIN.
FOOD DELIVERING AND ORDERING APPARATUS.
APPLICATION FILED DEC. 17, 1919.
1,360,657.
Patented Nov. 30, 1920.
6 SHEETS—SHEET 3.
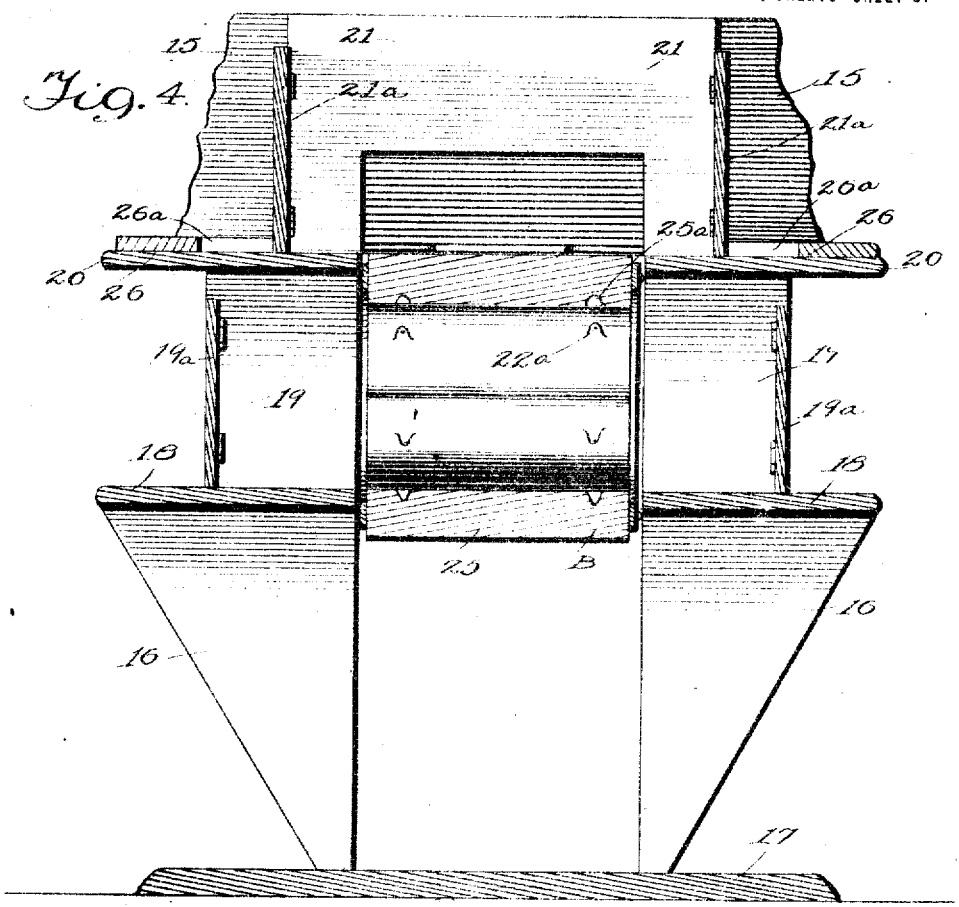
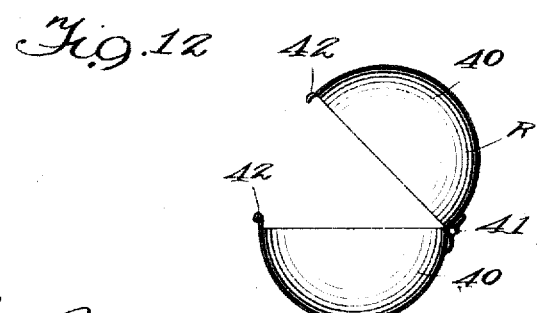
WITNESSES
INVENTOR
W. F. McGLAUGHLIN,
BY
ATTORNEYS W. F. McGLAUGHLIN.
FOOD DELIVERING AND ORDERING APPARATUS.
APPLICATION FILED DEC. 17, 1919.
1,360,657.
Patented Nov. 30, 1920.
6 SHEETS—SHEET 4.
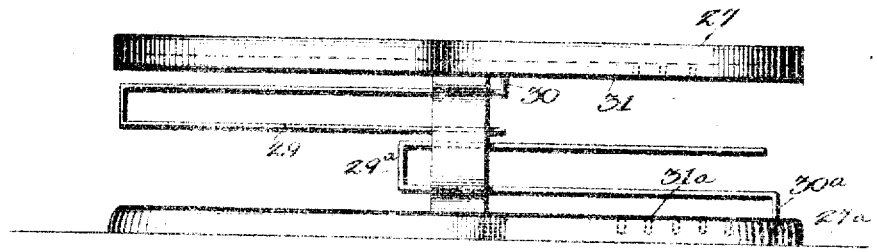
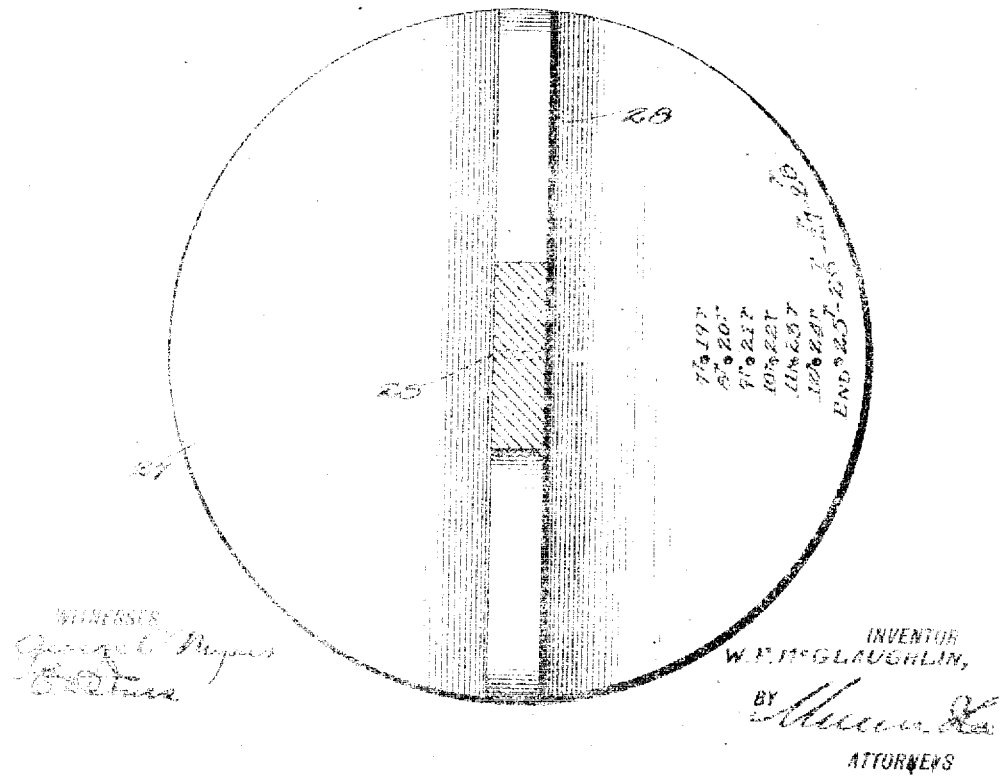

W. F. McGLAUGHLIN.
FOOD DELIVERING AND ORDERING APPARATUS.
APPLICATION FILED DEC. 17, 1919.
1,360,657.
Patented Nov. 30, 1920.
6 SHEETS—SHEET 5.
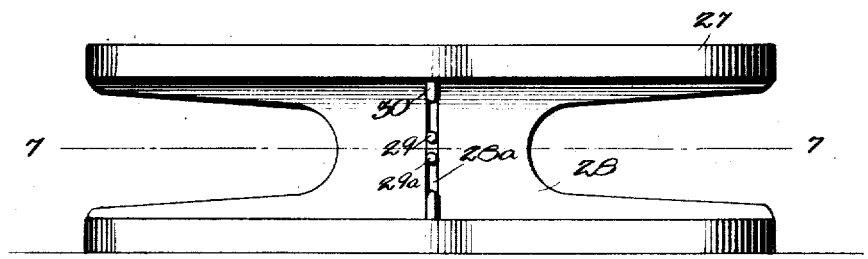
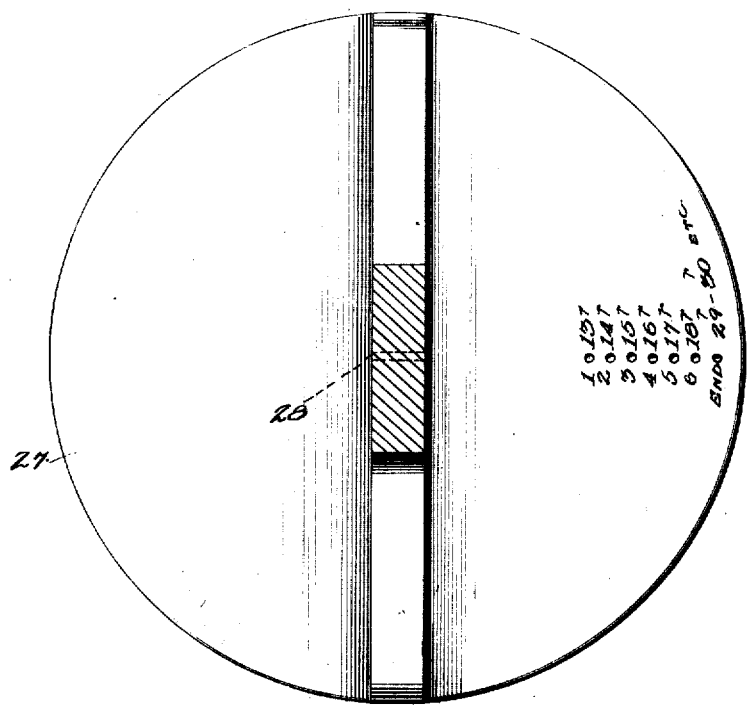
WITNESSES
INVENTOR
W. F. McGLAUGHLIN,
BY
ATTORNEYS W. F. McGLAUGHLIN.
FOOD DELIVERING AND ORDERING APPARATUS.
APPLICATION FILED DEC. 17, 1919.
1,360,657.
Patented Nov. 30, 1920.
6 SHEETS—SHEET 6.
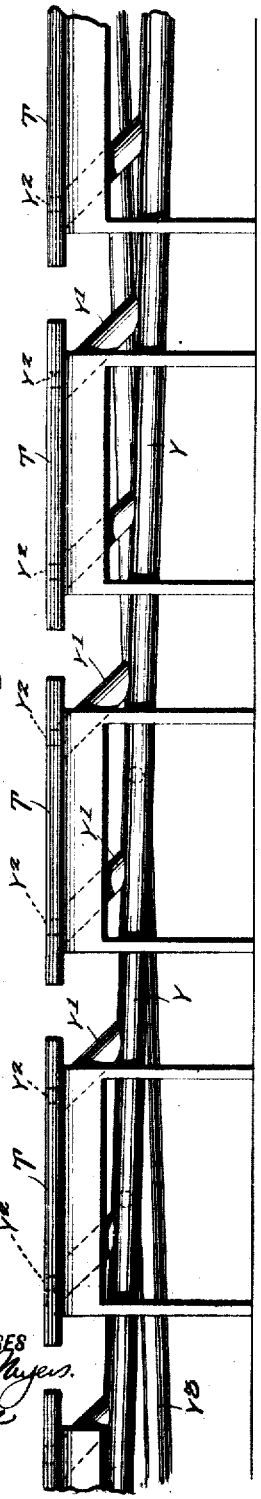
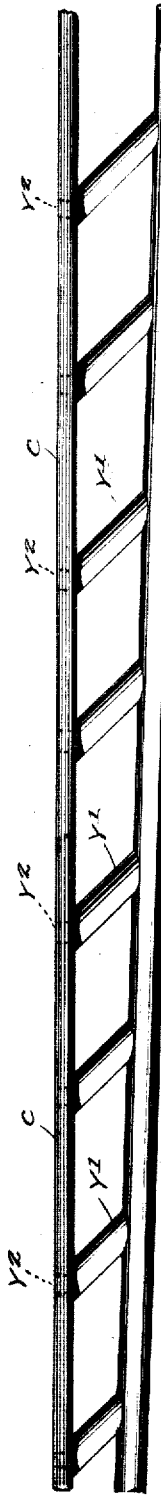
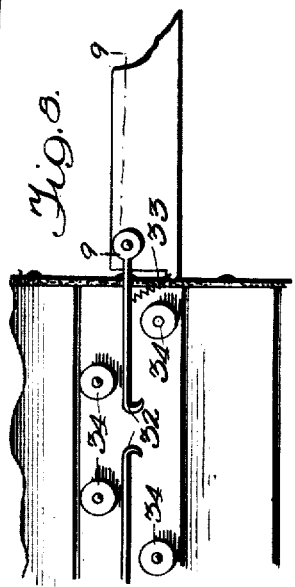
INVENTOR
W. F. McGLAUGHLIN,
BY
ATTORNEYS
WITNESSES

UNITED STATES PATENT OFFICE.

WILLIAM FRANCIS McGLAUGHLIN, OF DENVER, COLORADO, ASSIGNOR OF ONE-HALF TO RUSH DENNY GALBRETH, OF DENVER, COLORADO.

FOOD DELIVERING AND ORDERING APPARATUS.

1,360,657.  Specification of Letters Patent.  Patented Nov. 30, 1920.

Application filed December 17, 1919. Serial No. 345,685.

*To all whom it may concern:*

Be it known that I, WILLIAM F. MC-GLAUGHLIN, a citizen of the United States, and a resident of Denver, in the county of Denver and State of Colorado, have invented certain new and useful Improvements in Food Delivering and Ordering Apparatus, of which the following is a specification.

My invention relates to apparatus for automatically delivering trays of food to the diners in a restaurant and an apparatus for ordering food which is particularly designed for use in conjunction with the delivering apparatus.

It is a purpose of my invention to provide a delivering apparatus of the above-described character which effects the automatic delivery of trays of food to a distributing table whereby the distribution of the trays to the diners is facilitated, thus materially reducing the number of waiters usually required in a restaurant.

It is also a purpose of my invention to provide a delivering apparatus which is utilized to return the empty dishes to the kitchen of a restaurant.

It is also a purpose of my invention to provide an apparatus for ordering the dishes and for delivering the order to the kitchen, thus eliminating the intermediaries necessary for the transmission of orders from the diners to the chef.

I will describe one form of delivering apparatus and one form of ordering apparatus each embodying my invention, and will then point out the novel features thereof in claims.

In the accompanying drawings:—

Figure 1 is a view, showing in top plan a dining room and kitchen having applied thereto one form of delivering apparatus embodying my invention and one arrangement of counter, tables, and seats for use in conjunction with each apparatus;

Fig. 2 is a vertical sectional view, taken on the line 2—2 of Fig. 1;

Fig. 3 is a horizontal sectional view, taken on the line 3—3 of Fig. 2;

Fig. 4 is a transverse sectional view, taken on the line 4—4 of Fig. 2;

Fig. 5 is an enlarged detail view, showing in side elevation one form of tray embodying my invention;

Fig. 6 is a view, showing in front elevation the tray shown in Fig. 5;

Fig. 7 is a sectional view taken on the line 7—7 of Fig. 6 showing the inner side of the upper disk comprised in the tray shown in Figs. 5 and 6;

Fig. 7ª is a view similar to Fig. 7 showing the lower disk.

Fig. 8 is a fragmentary plan view, showing a portion of the delivery bolt and tray delivering hooks shown in Fig. 1;

Fig. 9 is a sectional view, taken on the line 9—9 of Fig. 8;

Fig. 10 is a view, showing in side elevation one form of ordering apparatus embodying my invention;

Fig. 11 is a view similar to Fig. 10, showing another form of ordering apparatus embodying my invention; and Fig. 12 is a view, showing in side elevation one form of order carrying device embodying my invention.

Similar reference characters refer to similar parts in each of the several views.

Referring specifically to the drawings, and particularly to Fig. 1, D designates generally the dining room of a restaurant, and K the kitchen, the latter being separated from the dining room by a partition 15. The dining room D in the present instance, is provided with a counter C which is in the form of an L, and arranged along the outer side of this counter at regular spaced intervals are seats S which are adapted to be occupied by the diners. T designates a plurality of tables which are arranged end to end and in a row parallel to the longer arm of the counter C. The tables T are likewise provided with a row of seats S. Located within the dining room at a point between the tables T and the counters C is a distributing table designated generally at A in which is mounted an endless conveyer designated generally at B. As shown in Figs. 1 and 2, the conveyer B extends longitudinally of the distributing table A and projects from the right end thereof through a suitable opening formed in the partition 15 and into the kitchen K. As illustrated to advantage in Figs. 2 and 4, the distributing table A comprises a plurality of triangularly shaped legs 16 which are arranged in pairs and supported upon a base board 17. The legs 16 support shelves 18, and the latter in turn support partitions 19 upon which are arranged shelves 20. The shelves 20 support partitions 21, and the partitions 19 and 21 which are arranged at regular spaced intervals, as shown in Fig. 2, are spanned at their outer edges by hinged double doors 19ª and 21ª, respectively.

As shown in Fig. 4, the arrangement of the several parts comprised in the distributing table A provides a space longitudinally through the table, and in this space is arranged the endless conveyer B. As shown in Fig. 2, the endless conveyer B comprises a pair of wheels 22, which are arranged on axles 23 suitably supported in the table, such wheels being operatively connected by a pair of endless belts 24 between which are secured flights or conveyer sections 25. As shown in Fig. 4, the periphery of each wheel 22 is formed with a series of teeth or lugs 22ª which are adapted to seat within recesses 25ª formed on the inner sides of the sections 25 whereby a positive driving connection between the sections and the wheels is secured. In the applied position of the conveyer B, the upper stretch of the conveyer is disposed in the same horizontal plane as the upper shelves 20, while the lower stretch of the conveyer is disposed in the same plane as the lower shelves 18, it being noted that the upper sides of the two surfaces lie flush with the upper side of the respective shelves. Power is applied to one or the other of the wheels 22 for driving the conveyer in the direction of the arrows in Fig. 2 so that the upper stretch of the conveyer moves outwardly from the kitchen K, while the lower stretch moves inwardly toward the kitchen. The upper stretch is arranged to convey a plurality of trays G from the kitchen K to predetermined points upon the distributing table A while the lower stretch is designed to convey the trays with the empty dishes from the distributing table rearwardly into the kitchen for a subsequent washing.

To effect the delivery of a tray to a predetermined point on the distributing table A, the upper shelves 20 of the table are provided with a connected series of U-shaped partitions 26 which provide open ended compartments 26ª, any one of which is adapted to receive a tray G. As shown in Figs. 1 and 2, I provide a compartment 26ª between every pair of partitions 21 so that the discharge of a tray from the conveyer B to one compartment is separate and distinct from adjacent compartments.

As shown in Figs. 5, 6 and 7, each tray G comprises a pair of superposed disks 27 and 27ª which are supported in spaced relation to each other by a standard 28 which is made preferably in the form shown in Fig. 6. The standard 28 is provided with a pair of vertically disposed slots 28ª which slidably receive a pair of substantially U-shaped metallic members 29 and 29ª which constitute loops to effect a removal of the trays from the conveyer, as will be hereinafter described. The members 29 and 29ª are adjustable longitudinally within the standard 28 and are adapted to be locked in any adjusted position by means of lugs 30 and 30ª respectively, which are adapted to seat within any one of a series of recesses 31 and 31ª respectively, formed on the confronting sides of the disks 27 and 27ª, respectively. As shown in Fig. 5, the members 29 and 29ª are capable of adjustment in different horizontal planes, the purpose of this adjustment being to vary the position of the closed end of the members so that they will engage predetermined hooks 32 carried by the shelves 20 of the distributing table A. As shown in Figs. 8 and 9, the hooks 32 are pivoted for swinging movement in a horizontal plane, a hook being provided for each compartment 26ª at a point adjacent the end nearest the kitchen, as clearly shown in Fig. 1. The hooks 32 of any two confronting compartments 26ª are of the same length and are biased to the position shown by means of springs 33, as illustrated to advantage in Fig. 8. As the hooks 32 progress from the kitchen end of the distributing table, each pair increases in length so that their bills will be disposed at different points above the surface of the conveyer B. In the present instance, I have shown eight pairs of hooks 32 successively increasing in length from the kitchen end of the distributing table, the next pair in advance being of the same length as the first pair but disposed in a higher horizontal plane, and with succeeding pairs gradually increasing in length as with the first eight pairs. The purpose of this arrangement is to secure a coaction between the member 29ª of a tray G and the eight pairs of hooks of the first set, while the remaining pairs of hooks being in a higher plane are adapted to coact with the upper member 29. The coaction of the hooks and members will be more clearly understood from the description of the entire operation of the apparatus.

As shown in Figs. 1 and 3, the outer side of the conveyer B is provided at intervals with a plurality of pulleys or wheels 34 which are adapted to engage the tray G and are arranged to assist the hooks 32 in discharging the trays from the conveyer. On the inner side of the conveyer, or other pulleys 35 are mounted which are arranged in groups of threes that extend diagonally of the conveyer to effect a discharge of the trays and their empty dishes therefrom and into a chute designated generally at E. As shown in Fig. 3, the forward end of the chute E is bent at an angle and overlies the lower stretch of the conveyer B so that with the conveyer moving in the direction indicated by the arrows in Fig. 2, the trays G are caught by the chute and discharged from the conveyer whereupon the dishes may be removed from the tray and the latter again used in delivering the food to the distributing table.

As shown in Fig. 1, the walls of the opening formed in the partition 15, are provided with rollers 36 which guide the trays centrally onto the conveyer B as they are introduced to the conveyer. The kitchen end of the conveyer is shown disposed adjacent a tray table 37 from which the trays are placed upon the conveyer, as will be understood.

The operation of the delivery apparatus is as follows:

With the conveyer B moving in the direction indicated by the arrows in Fig. 2, trays G, as they are placed thereupon, are fed forwardly over the distributing table A. When it is desired to deliver a particular tray containing certain dishes for a particular diner, the member 29 or 29ª is adjusted and the tray properly positioned on the conveyer so that the closed ends of either member will engage the desired hook 32. As the tray travels forwardly over the distributing table A, the hook 32 which is disposed in the path of movement of the member 29 or 29ª engages the latter and, under the forward movement of the conveyer, the tray is swung by the pulleys 34 about the pivot point of the hook 32 as a center, thus causing the tray to be discharged laterally from the conveyer into the corresponding compartment. The compartments and trays are preferably numbered and the tables and counter also numbered correspondingly so that the tray delivered in a particular compartment can be readily identified with the diner occupying the corresponding seat. For example, as shown in Fig. 1, the compartments on one side of the delivering table are numbered from 1ᵖ to 12ᵖ beginning at the kitchen end of the table while, the compartments on the other side are numbered from 13ᵖ to 24ᵖ. A portion of the counter C is numbered to correspond to the compartments from 1ᶜ to 12ᶜ, while certain of the tables T are numbered from 13ᵗ to 24ᵗ to correspond to the compartments on the adjacent side of the delivering table. The remainder of the tables and counter seats are numbered beginning with 25ᵗ or 25ᶜ, respectively. As shown in Figs. 7 and 7ª, the recesses 31 and 31ª are each numbered twice, with the exception of the outermost recesses which are numbered a plurality of times. The recesses numbered twice correspond to the compartments on either side of the delivering table, and the numbers adjacent the outermost recesses correspond to the seats above twenty-four.

To receive the trays above twenty-four, I provide an auxiliary table A' which is formed on the forward end of the main table A, as shown in Fig. 1. This auxiliary table is not provided with compartments but is merely adapted to receive the trays in any order for delivery to the seats numbered above twenty-four.

In this manner a plurality of trays can be successively delivered to the proper compartments of the distributing table so that they may be ultimately served to the respective diners. As a tray G has discharged from the conveyer B, it is deposited upon one of the shelves 20 between a pair of partitions 21, and under the action of the pulleys 34 it is forced outwardly between the hinged doors 21ª into the compartment 26ª.

When it is desired to return the tray and dishes thereon to the kitchen for washing, they are placed upon the shelves 18 and moved through the bars 19ª and onto the lower stretch of the conveyer, the latter carrying the tray forwardly into the chute E, as has been previously described.

In conjunction with the tray delivering apparatus just described, I employ an apparatus for conveying order slips from each of the diners to the kitchen K, and after the order has been filled, the slip is conveyed to the cashier's desk Z, Fig. 1, where it is retained to await payment of the same by the diner. These slips are adapted to be numbered according to the particular table or portion of the counter occupied by a diner, so that when it is delivered to the kitchen, the tray containing the dishes ordered by the diner is adjusted to be automatically delivered to the corresponding compartment in the manner previously described. This system, in the present instance, is carried out by means of the apparatus shown in Figs. 10 and 11. In Fig. 10, I have shown a main conveying tube which is disposed below the several tables T in Fig. 1, and is inclined from one end to the other in the direction of the kitchen K. This tube is designated at Y, and is shown as provided with a plurality of branch tubes Y' which communicate with suitable openings Y² formed in the tables T. These branch tubes Y' are also inclined for a purpose which will be hereinafter described.

The order slips are placed within a receptacle R such as shown in Fig. 12, and this receptacle is deposited within any one of the branch pipes Y'. As the receptacle is of spherical formation, it is obvious that the same will gravitate into the main tube Y, and because of the inclination of the latter will roll to its lower end, where it is deposited in a suitable receptacle (not shown) located within the kitchen K. As shown in Fig. 12, the receptacle R comprises two semi-spherical sections 40, which are hingedly connected as at 41, and adapted to be locked in the form of a sphere by means of spring clips 42. This receptacle is also adapted to be used in conjunction with the apparatus shown in Fig. 11, the latter being identical to that shown in Fig. 10 but applied to the counter C, as shown in Fig. 1.

For conveying the receptacle R from the kitchen to the cashier's desk, I provide another inclined tube $Y^3$, as shown in Fig. 10. It will be understood that the receptacles are introduced into the upper end of the tube $Y^3$ and delivered at the lower end to the cashier's desk.

From the foregoing description of the delivering apparatus and the order conveying apparatus, it will be manifest that the two coöperate to provide an efficient system for conveying order slips to the kitchen and ultimately to the cashier and for filling these orders and delivering the trays to the several compartments of the distributing table.

Although I have herein shown and described only one form of delivering apparatus and one form of order conveying apparatus embodying my invention, it is to be understood that various changes and modifications may be resorted to without departing from the spirit of the invention and the spirit and scope of the appended claims.

Having thus described my invention, I claim:—

1. A food delivering apparatus comprising a distributing table having compartments formed therein, hooks for each of the compartments pivoted on said table, a movable conveyer, trays adapted to be placed on said conveyer, rollers carried by said conveyer, and adjustable means carried by the trays which are engageable with said hooks for effecting an automatic discharge of the trays from the conveyer to predetermined compartments.

2. A food delivering apparatus comprising a distributing table having compartments formed therein, a conveyer movable adjacent the compartments, trays adapted to be placed upon said conveyer, pivoted means carried by said table, rotary means carried by said conveyer, and adjustable means carried by said trays which coact with said pivoted and rotary means for effecting an automatic discharge of the tray to predetermined compartments.

3. A food delivering apparatus comprising a distributing table, a conveyer movable through the table, compartments formed in the table and disposed upon opposite sides of said conveyer, trays adapted to be carried by said conveyer, pivoted means carried by said table, rotary means carried by said conveyer, and adjustable means carried by said trays coacting with said pivoted and rotary means for effecting an automatic discharge of the trays into predetermined compartments.

4. A food delivering apparatus comprising a distributing table having compartments formed therein, a conveyer movable adjacent said compartments, hooks pivoted on said table in each of said compartments, means for biasing said hooks to predetermined positions, rotary means carried by said conveyer and engageable with said trays for guiding the latter toward said compartments, and adjustable means carried by said trays and engageable with said hooks for causing the latter to discharge the trays from the conveyer into predetermined compartments.

5. A food delivering apparatus comprising a distributing table having compartments formed therein, a conveyer movable adjacent the compartments, two series of hooks pivoted on the table and biased to predetermined positions, the hooks of both series being of graduating lengths with the hooks of one series being disposed in a different horizontal plane from the hooks of the other series, trays adapted to be carried by said conveyer, and adjustable means carried by said tray and engageable with the hooks of either series for effecting a discharge of the trays into predetermined compartments.

6. A tray for the purpose described comprising pairs of spaced members having recesses formed therein, and members slidable between said members and engageable with said recesses for locking the second members in adjusted position.

7. A tray of the character described comprising spaced disks, a standard between said disks, members slidable through said standard and between said disks, and coacting means carried by said members and disks for locking the members in adjusted position.

8. In combination, an apparatus for delivering trays comprising an endless conveyer, a distributing table having compartments formed therein, means carried by said table and conveyer for effecting an automatic discharge of trays from the conveyer into predetermined compartments, dining tables arranged adjacent said table and corresponding to said compartments, and an ordering apparatus comprising an inclined tube, and inclined branch tubes connected to said tube and communicating with said table.

9. In combination, a conveyer comprising an endless belt, a trough having one end thereof overlying one stretch of the belt, and wheels carried by said belt, said wheels being arranged in groups which extend diagonally of the belt for the purpose described.

WILLIAM FRANCIS McGLAUGHLIN.